April 28, 1931.  D. TYRER  1,803,221
PRODUCTION OF HYDROGEN
Filed Jan. 21, 1930
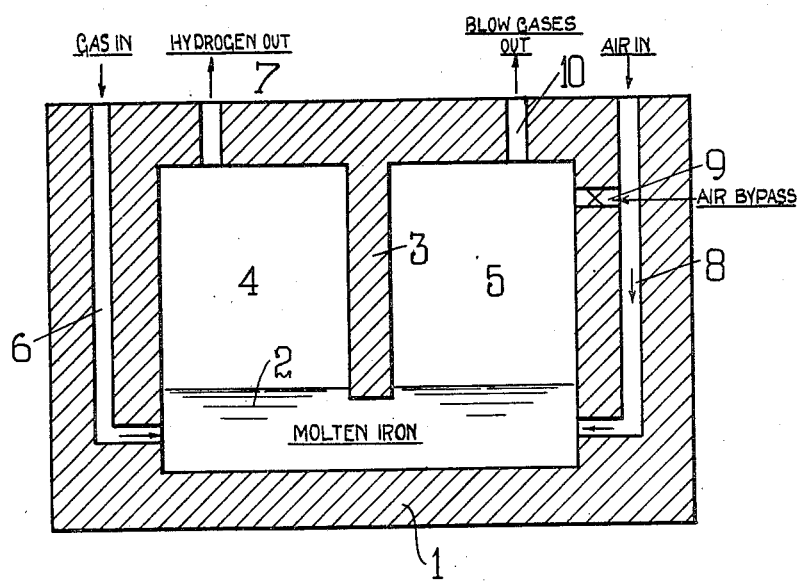

Patented Apr. 28, 1931

1,803,221

UNITED STATES PATENT OFFICE

DANIEL TYRER, OF NORTON-ON-TEES, ENGLAND, ASSIGNOR TO IMPERIAL CHEMICAL INDUSTRIES LIMITED, OF LONDON, ENGLAND, A BRITISH COMPANY

PRODUCTION OF HYDROGEN

Application filed January 21, 1930, Serial No. 422,443, and in Great Britain January 25, 1929.

This invention relates to the production of hydrogen from methane or methane containing gases.

It is known that when methane is heated to 1000° C. or over it is dissociated into its elements. Also it is known that by the separate combustion of the dissociated carbon sufficient heat can be obtained for the requirements of the reaction. One of the difficulties of carrying out this process is to separate the carbon at the point where it is desired subsequently to burn it; there is a tendency for much of the carbon to be carried out of the decomposing chamber in the form of dust.

It is the object of the present invention to overcome this difficulty and at the same time to provide a more advantageous method of carrying out the process.

According to the invention we bring the methane or methane containing gas into contact with molten iron. This has the property of dissolving and thus "fixing" the carbon.

According to a further feature of the invention we blow air or other oxygen containing gas through the solution of carbon in iron thus obtained, when the dissolved carbon is oxidized and at the same time produces enough heat to keep the iron molten and to dissociate the methane. Preferably secondary air is supplied to the space above the molten iron to burn any carbon monoxide to carbon dioxide.

The entering gases are preferably preheated, it may be by heat exchange with the combustion gases.

When the gases contain a high percentage of methane the quantity of carbon formed will, on combustion with air, furnish more heat than is required to decompose the methane. The surplus heat may then be utilized by introducing some steam together with the methane containing gas.

The process may be worked continuously as follows:—

The vessel containing the molten iron is divided into two parts by a partition wall, which by dipping just below the surface of the molten metal, completely separates the two gaseous zones, but leaves the iron free to circulate between the two sections. Methane containing gas is blown in on one side of the partition and the oxidizing air on the other side.

The oxidizing air is most suitably admitted partly below, partly above the surface of the molten iron in order to ensure complete combustion of the carbon to carbon dioxide.

The gases may be blown in tangentially so as to cause the iron to circulate.

The relative ratio of gas and air is adjusted so as to keep the carbon content of the iron below saturation point. The temperature of the iron may be from 1200–1300° C.

The molten iron may contain manganese (to increase the solubility of the carbon) or nickel or other alloying metal which is known to catalyze the methane dissociation.

Steam may be added to the methane if desired.

The invention is illustrated in the accompanying drawing which represents diagrammatically in longitudinal section one form of apparatus suitable for carrying the process into effect. Molten iron 2 is contained in the vessel 1 (which may be constructed of the usual materials used for making steel furnaces). A partition 3 divides the vessel up into compartments 4 and 5.

Hydrocarbon gas is blown in through the pipe 6 into the molten iron and the hydrogen escapes from the compartment 4 by the pipe 7. The air enters by pipe 8. Part of the air passes through a valve 9 direct into the compartment 5 where it oxidizes the carbon monoxide present in the blow gases. The remainder of the air passes down pipe 8 and into the iron. The burnt blow gases leave the apparatus by pipe 10.

I declare that what I claim is:

1. Process of producing hydrogen which consists in decomposing hydrocarbon gases by bringing them into contact at a high temperature with a molten metal capable of dissolving carbon, and then burning out the carbon from said metal by means of a gas containing oxygen.

2. Continuous process of producing hydrogen which comprises introducing a gaseous hydrocarbon and a gas containing oxygen into separate portions of a body of molten metal capable of dissolving carbon.

3. The process as claimed in claim 2 in which the gases are blown in tangentially to cause the molten metal to circulate.

4. The process of producing hydrogen which consists in decomposing hydrocarbon gases by bringing them into contact with molten iron, and then blowing said iron with a gas containing oxygen.

5. The process of producing hydrogen which consists in decomposing hydrocarbon gases by bringing them into contact with molten iron and an alloying metal and then blowing said iron with a gas containing oxygen.

6. The process of producing hydrogen which consists in decomposing hydrocarbon gases by bringing them into contact with molten iron, and manganese and then blowing said iron with a gas containing oxygen.

7. The process of producing hydrogen which consists in decomposing hydrocarbons gases and steam by bringing them into contact with molten iron, and then blowing said iron with a gas containing oxygen.

In witness whereof, I have hereunto signed my name this 9th day of January, 1930.

DANIEL TYRER.